Figure 1:
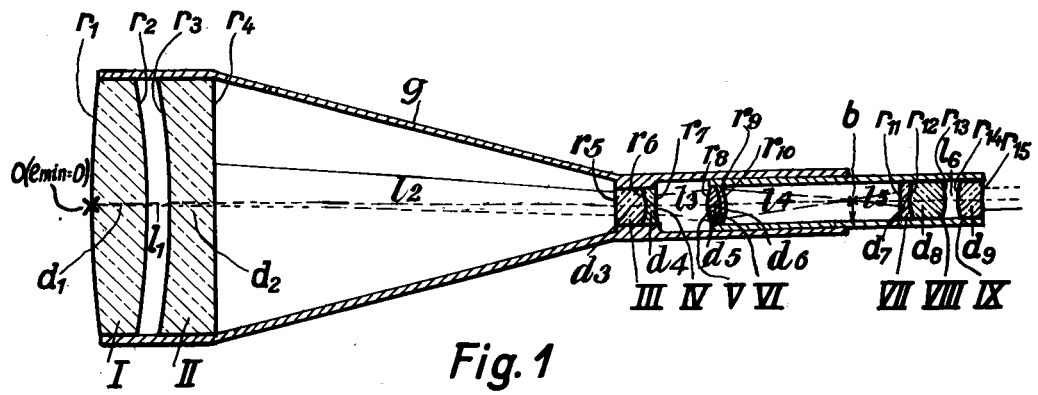

March 27, 1934.    A. KÖNIG    1,952,759
TELESCOPE
Filed March 13, 1931    2 Sheets-Sheet 1

| $v = l_{3max} - l_{3min} = 10$ | |
|---|---|
| $r_1 = + 505.47$ | $d_1 = 21.0$ |
| $r_2 = - 364.43$ | $l_1 = 9.0$ |
| $r_3 = - 355.33$ | $d_2 = 18.0$ |
| $r_4 = -2396.00$ | $l_2 = 934.5$ |
| $r_5 = - 27.50$ | $d_3 = 2.66$ |
| $r_6 = - 9.15$ | $d_4 = 1.0$ |
| $r_7 = + 13.00$ | $l_3 = 10$ (for $e_{max}$) to 20 (for $e_{min}$) |
| $r_8 = + 27.60$ | $d_5 = 1.0$ |
| $r_9 = - 5.56$ | $d_6 = 0.5$ |
| $r_{10} = - 15.00$ | $l_4 = 39.2$ |
| $r_{11} = - 165.23$ | $l_5 = 6.2$ |
| $r_{12} = + 7.18$ | $d_7 = 0.9$ |
| $r_{13} = - 9.71$ | $d_8 = 3.4$ |
| $r_{14} = + 8.80$ | $l_6 = 1.0$ |
| $r_{15} = \infty$ | $d_9 = 2.3$ |

| | I | II | III | IV | V |
|---|---|---|---|---|---|
| $n_D =$ | 1.51632 | 1.61266 | 1.6477 | 1.5163 | 1.5602 |

| | VI | VII | VIII | IX |
|---|---|---|---|---|
| $n_D =$ | 1.6200 | 1.648 | 1.516 | 1.573 |

Inventor:

Albert König $$v = l_{4max} - l_{4min} = 10$$

| | | | |
|---|---|---|---|
| $r_1$ = + 505.47 | $d_1$ = 21.0 | | |
| $r_2$ = − 364.43 | $l_1$ = 9.0 | | |
| $r_3$ = − 355.33 | $d_2$ = 18.0 | | |
| $r_4$ = −2396.00 | $l_2$ = 936.3 | | |
| $r_5$ = + 14.10 | $l_3$ = 38.0 | | |
| $r_6$ = + 7.20 | $d_3$ = 1.6 | | |
| $r_7$ = − 21.20 | $d_4$ = 4.0 | | |
| $r_8$ = − 165.23 | $l_4$ = 7.8 (for $e_{max}$) to 17.8 (for $e_{min}$) | | |
| $r_9$ = + 7.18 | $l_5$ = 6.2 | | |
| $r_{10}$ = − 9.71 | $d_5$ = 0.9 | | |
| $r_{11}$ = + 8.80 | $d_6$ = 3.4 | | |
| $r_{12}$ = ∞ | $l_6$ = 1.0 | | |
| | $d_7$ = 2.3 | | |

| | I | II | X | XI |
|---|---|---|---|---|
| $n_D$ = | 1.51632 | 1.61266 | 1.6477 | 1.5163 |

| | VII | VIII | IX |
|---|---|---|---|
| $n_D$ = | 1.648 | 1.516 | 1.573 |

Inventor:

Albert König

UNITED STATES PATENT OFFICE 1,952,759

TELESCOPE

Albert König, Jena, Germany, assignor to the firm
Carl Zeiss, Jena, Germany

Application March 13, 1931, Serial No. 522,419
In Germany March 21, 1930

4 Claims. (Cl. 88—32)

I have filed an application in Germany, March 21, 1930.

When points lying near a stationary telescope at different distances from the same are to be examined with respect to their being in a straight line, usually a telescope is applied, the lenses of which are adjustable relatively to each other. Whether the objective, or the ocular, or an additional lens system disposed between objective and ocular, is displaced, the fact that objects near the telescope are concerned will in any case require the focusing adjustment to be rather great.

If $v$ denote the displacement of the image produced by the objective and, further, supposing the objective is fixed, if $f_1$ and $f_2$ designate the focal lengths of the objective and the ocular, $a$ the distance of the anterior focus of the objective from the front surface of the objective, and $e$ the distance of the object from this surface, the following equation is valid:

$$(1) \quad v = f_1^2 \left( \frac{1}{(e-a)_{min}} - \frac{1}{(e-a)_{max}} \right) = \frac{f_1^2 (e_{max} - e_{min})}{(e-a)_{max}(e-a)_{min}}$$

and the magnification $n$ of the image in the usual distance of vision of 250 mm. is $$(2) \quad n = \frac{f_1}{f_2} \cdot \frac{250}{(e-a)_{max}}$$

From these two equations (1) and (2) follows that $$(3) \quad v = \frac{n f_1 f_2 (e_{max} - e_{min})}{250(e-a)_{min}}$$

The Equation (3) for the image displacement $v$ is valid, regardless of whether the anterior focus of the objective is in front of or behind the limits of the distance $e_{max} - e_{min}$, when $e_{min}$ always indicates that end point of this distance which is next to the said focus.

The purpose of the invention is to reduce the value $v$ of the image displacement and, consequently, also that of the required forcusing displacement which is not only desired for the sake of having a telescope of small dimensions and reduced weight but also for the reason that, when manufactured, a short guide for a displaceable part will turn out to be more accurate mechanically than a long guide. On the other hand the guide will have to meet less exacting requirements when a displaceable additional lens system is used for compensating the image displacement, in which case, however, the focusing adjustment takes greater values.

Hitherto it has been tried to reduce the focusing adjustment by reducing the focal lengths $f_1$ and $f_2$ of the objective and the ocular respectively. This reduction, however, was always restricted within comparatively narrow limits owing to the necessity of avoiding too great aperture ratios that would impair the quality of the image. In the case of the invention the purpose aimed at is attained by making the value $(e-a)_{min}$ great compared with the focal length $f_1$; in other words, with a given distance $e_{min}$ and a given focal length $f_1$, the distance $a$ of the focus is given a suitable value. The value $a$ may lie within wide limits when, according to the invention, the objective system of the telescope is so constructed that its anterior focus lies outside the outermost points of an axial section containing the object to be viewed, and that, in the direction of light this focus has relatively to the said axial section a position which corresponds to its position relative to the objective system. The focus therefore lies either in front of or behind the objective system, quite in accordance whether it is in front of or behind the limits of the distance. Comparatively small focusing adjustments of the lenses will suffice when the objective system consists of a converging front member and a posterior member which lies near the rear focus of the said front member and whose focal length may be positive or negative, the absolute value of this rear member being at most one quarter of the focal length of the front member. As soon as the image produced by the objective system becomes virtual for a part of the space within the limits of the distance, a compound microscope or a compound magnifier may be used instead of a single ocular system.

The solution of the task explained above permits of giving the focal length $f_1$ of the objective system an infinitely great value. In this case also the distance $a$ of the focus is infinitely great, whereas the quotient $$\frac{f_1}{(e-a)_{min}}$$

has a finite value. This special case offers the advantage that the distant object appears to the observer's eye always in the same size when the difference in the object distances $e$ is compensated by respectively adjusting the ocular, or appears nearly in the same size when this compensation is effected by means of an additional lens system. Regardless of the object distance $e$ the observation will therefore always be of the same, or practically the same, exactitude so that, for example, the image of a line mark disposed at the object distance $e$ can be narrowly enclosed by double filaments in the field of view of the ocular or, when using a micrometer screw, that a reading can be taken on a scale provided on the object or on a vernier in the ocular.

In order to avoid the objective system being used with too great an aperture ratio when small distances $e$ are concerned, it is advisable to constrict this aperture ratio by means of a diaphragm arranged near the posterior focus of the front member of the system. This diaphragm may eventually be formed by the mount of a telescope lens having a suitable position.

Figure 2:
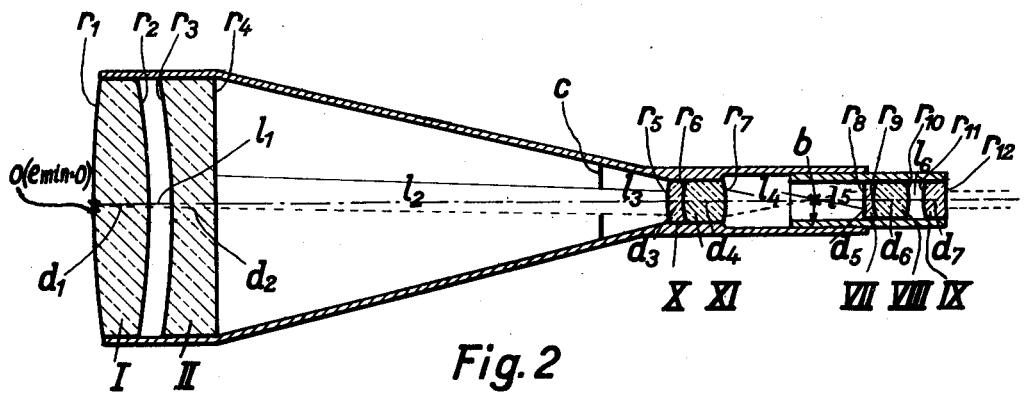

The accompanying drawings, which illustrate the invention, show in Figures 1 and 2 schematically and in longitudinal sections two telescopes in which the distance of the anterior focus of the objective system from the front surface of this objective system is infinitely great. In the first example (Figure 1), the objective system of the telescope consists of a front converging member and a rear diverging member. In the second example (Figure 2), the objective system consists of the front converging member of the first example combined with a rear converging member.

Both examples are based on a distance $e$ of an object $o$, which may be given any value lying between the limits $$e_{max} = 25000 \text{ and } e_{min} = 0$$

and compensated by correspondingly focusing the ocular system.

In the figures of the accompanying drawings, the path of single rays imaging an axial point $o$ is indicated in full and in dash lines, respectively, for the two limiting cases, in which the point $o$ is at the maximum and at the minimum distance. In the two examples, the objective system of the telescope is disposed in a tube $g$, and the ocular system of the telescope in a tube $h$ so inserted into the tube $g$ as to be displaceable in axial direction.

According to the first example (Fig. 1) the objective system having an infinitely great focal length consists of a front converging partial system and a rear diverging partial system. The front partial system whose focal length is $+1000$ is formed by a single converging lens I and a single diverging lens II. The focal length of the rear partial system is $-20$; this partial system consists of a converging lens III and a diverging lens IV cemented thereto and is not far away from the posterior focus of the front partial system. As an ocular system is used the optical system of a microscope having the total focal length $+10$. Part of the microscope system is formed by a microscope objective having a focal length $+20$ and consisting of a converging lens V and a diverging lens VI cemented thereto. The microscope system is completed by an orthoscopic ocular having a focal length $+10$ and consisting of a diverging lens VII, a converging lens VIII cemented thereto and a single converging lens IX. The anterior focus of the microscope ocular is designated $b$. In the case of small object distances the mount of the microscope objectives V, VI serves as a constricting diaphragm for the pencil of imaging rays passing the objective system I, II, III, IV, whereas in the case of greater object distances the constriction is provided by the mount of the front member I, II of the objective.

The objective system according to the second example (Fig. 2) has also an infinitely great focal length; it consists of a front converging partial system having a focal length $+1000$ which is exactly the same as that according to the first example, and a rear converging partial system. This rear partial system consists of a diverging lens X and a converging lens XI cemented thereto and has a focal length $+20$. It is provided not far away from the posterior focus of the front partial system. The ocular system is an orthoscopic ocular of a focal length $+10$ which equals in all respects the microscope ocular according to the first example. The three lenses of this ocular are also designated VII, VIII, IX, and its anterior focus is denominated $b$. A stop $c$ is provided for constricting the pencil of imaging rays passing the objective system I, II, X, XI.

In the subjoined tables, which contain the necessary data for the two examples, $v$ designates the maximal image displacements, $r$ the radii, $d$ the glass thicknesses and $l$ the mutual distances of the lenses, while $n_D$ denotes the refractive indices of the kinds of glass used in the examples with respect to the D line of the solar spectrum.

First Example (Fig. 1)

$$v = l_3 \text{ max} - l_3 \text{ min} = 10$$

| | |
|---|---|
| $r_1 = +$ 505.47 | $d_1 =$ 21.0 |
| $r_2 = -$ 364.43 | $l_1 =$ 9.0 |
| $r_3 = -$ 355.33 | $d_2 =$ 18.0 |
| $r_4 = -$ 2396.00 | $l_2 =$ 934.5 |
| $r_5 = -$ 27.50 | $d_3 =$ 2.66 |
| $r_6 = -$ 9.15 | $d_4 =$ 1.0 |
| $r_7 = +$ 13.00 | $l_3 =$ 10 (for $e_{max}$) to 20 (for $e_{min}$) |
| $r_8 = +$ 27.60 | $d_5 =$ 1.0 |
| $r_9 = -$ 5.56 | $d_6 =$ 0.5 |
| $r_{10} = -$ 15.00 | $l_4 =$ 39.2 |
| $r_{11} = -$ 165.23 | $l_5 =$ 6.2 |
| $r_{12} = +$ 7.18 | $d_7 =$ 0.9 |
| $r_{13} = -$ 9.71 | $d_8 =$ 3.4 |
| $r_{14} = +$ 8.80 | $l_6 =$ 1.0 |
| $r_{15} =$ ∞ | $d_9 =$ 2.3 |

| Lens | I | II | III | IV | V |
|---|---|---|---|---|---|
| $n_D$ | 1.51632 | 1.61266 | 1.6477 | 1.5163 | 1.5602 |

| Lens | VI | VII | VIII | IX | |
|---|---|---|---|---|---|
| $n_D$ | 1.6200 | 1.648 | 1.516 | 1.573 | |

Second Example (Fig. 2)

$$v = l_4 \text{ max} - l_4 \text{ min} = 10$$

| | |
|---|---|
| $r_1 = +$ 505.47 | $d_1 =$ 21.0 |
| $r_2 = -$ 364.43 | $l_1 =$ 9.0 |
| $r_3 = -$ 355.33 | $d_2 =$ 18.0 |
| $r_4 = -$ 2396.00 | $l_2 =$ 936.3 |
| $r_5 = +$ 14.10 | $l_3 =$ 38.0 |
| $r_6 = +$ 7.20 | $d_3 =$ 1.6 |
| $r_7 = -$ 21.20 | $d_4 =$ 4.0 |
| $r_8 = -$ 165.23 | $l_4 =$ 7.8 (for $e_{max}$) to 17.8 (for $e_{min}$) |
| $r_9 = +$ 7.18 | $l_5 =$ 6.2 |
| $r_{10} = -$ 9.71 | $d_5 =$ 0.9 |
| $r_{11} = +$ 8.80 | $d_6 =$ 3.4 |
| $r_{12} =$ ∞ | $l_6 =$ 1.0 |
| | $d_7 =$ 2.3 |

| Lens | I | II | X | XI |
|---|---|---|---|---|
| $n_D$ | 1.51632 | 1.61266 | 1.6477 | 1.5163 |

| Lens | | VII | VIII | IX |
|---|---|---|---|---|
| $n_D$ | | 1.648 | 1.516 | 1.573 |

I claim:
1. A telescope for successively viewing objects lying near the telescope but at different distances from the same, the lens system of the telescope consisting of an objective system and an ocular system, these two systems being adjustable relatively to each other, the anterior focus of the objective system of the telescope being outside the limits of the object distances and, in the sense of the light direction, before these limits only when it lies before the objective system, the objective system consisting of a front converging member and a rear member, this rear member being near the posterior focus of the front member and having a focal length amounting with respect to its absolute value to at most one quarter of the focal length of the front member, these two members having such a mutual distance that the distance of the anterior focus of the objective system from the objective system is at least approximately infinitely great.

2. In a telescope according to claim 1, the objective system consisting of a front converging member and a rear member, and a diaphragm provided near the posterior focus of the front member.

3. In a telescope according to claim 1, the objective system consisting of a front converging member and a rear diverging member and the ocular system consisting of a microscope formed by a microscope objective and an ocular.

4. In a telescope according to claim 1, the objective system consisting of a front converging member and a rear converging member.

ALBERT KÖNIG.